A. P. STEINER.
FRICTION CLUTCH.
APPLICATION FILED OCT. 11, 1910.
1,186,243.
Patented June 6, 1916.
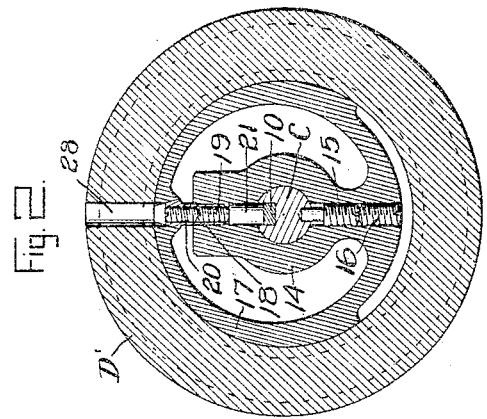
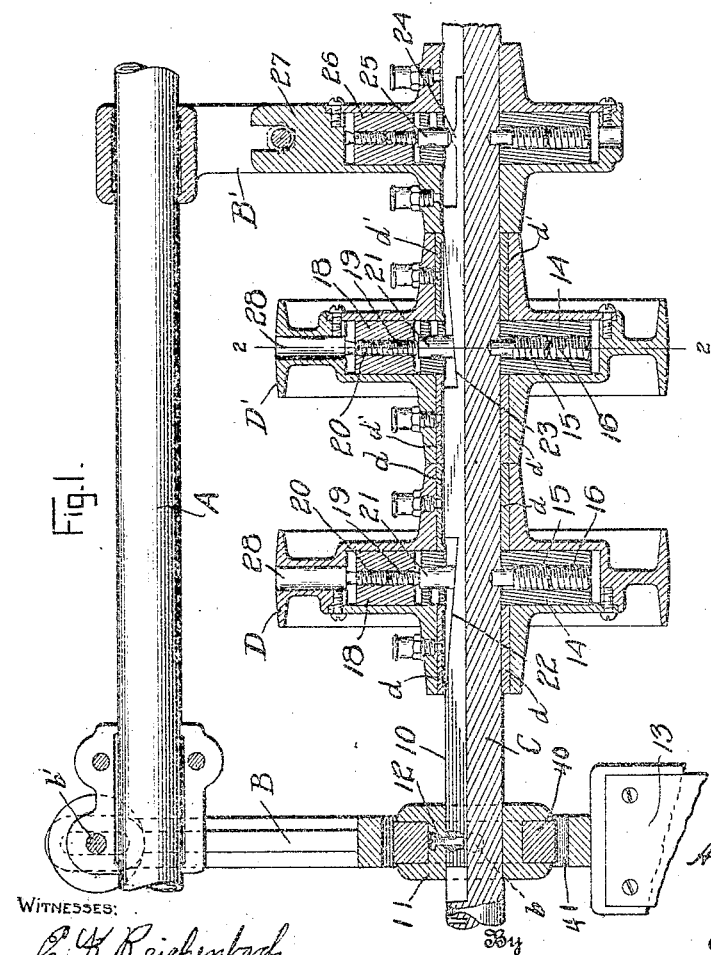

UNITED STATES PATENT OFFICE.

AMOS P. STEINER, OF WAYNESBORO, PENNSYLVANIA, ASSIGNOR TO LANDIS TOOL COMPANY, OF WAYNESBORO, PENNSYLVANIA, A CORPORATION OF PENNSYLVANIA.

FRICTION-CLUTCH.

1,186,243.

Specification of Letters Patent.

Patented June 6, 1916.

Application filed October 11, 1910. Serial No. 586,569.

*To all whom it may concern:*

Be it known that I, AMOS P. STEINER, a citizen of the United States, residing at Waynesboro, in the county of Franklin and State of Pennsylvania, have invented certain new and useful Improvements in Friction-Clutches, of which the following is a specification.

My said invention consists in certain improvements in the details of construction and arrangement of parts of friction clutch mechanism, whereby such a clutch is provided which is compact in construction, powerful in its operation, and easily operated, and also one whereby the speed may be changed quickly and easily and without undue strain upon the driving gear, all as will be hereinafter more fully described and claimed.

Referring to the accompanying drawings which are made a part hereof, and on which similar reference characters indicate similar parts, Figure 1 is a central longitudinal section through a counter-shaft provided with a friction clutch mechanism of my improved construction, and Fig. 2 a cross section on the dotted line 2—2 in Fig. 1.

In said drawings the portions marked A represent an overhead hanger (or other appropriate) support, B, B' hangers thereon, C a counter-shaft journaled in appropriate bearings (not shown) and extending through said hangers, and D, D' driving pulleys on said counter-shaft.

The features of construction other than that relating to the clutch mechanism are, or may be, of any desired or approved form, adapted for any use for which the clutch may be particularly designed.

The counter-shaft C is grooved longitudinally and has a sliding clutch-operating key 10 mounted therein. A grooved bushing 11 with a ring 40 in the groove, is mounted on said shaft and connected with said key by a screw 12. Said ring is connected by pivots $b$ with a yoke 41 formed in the lower end of hanger B, which is hung to swing on pivot $b'$. An operating lever 13 is mounted on the lower end of hanger B, by which it is operated to slide key 10 back and forth.

Belt pulleys D and D' are each formed with hubs having linings $d$ and are loosely mounted on shaft C around centers 14, which are rigidly secured by set screws 15 held in place by lock screws 16. Said centers 14 each carry an expanding friction ring 17 formed in piece therewith on one side of the axis and with its sides nearly approaching each other on the opposite side of the axis, where the adjacent edges are formed tapered, as shown most clearly in Fig. 2. Each pulley fits over one of said friction rings, the exterior face of the ring being adapted to engage an interior face of the pulley formed and prepared for the purpose. A clutch expanding wedge 18 is mounted to slide axially in a perforation in each center, its outer end being wedge-shaped and inserted between the adjacent tapered edges of the two sides of said ring. Said wedge is formed with a screw-threaded perforation in which is mounted a screw 19 projecting slightly beyond its inner end and locked in the desired adjustment by a locking screw 20. A sliding operating plunger 21 is mounted beneath said wedge with one end adapted to bear against the inner end of said screw 19 and the other end adapted to rest upon the edge of sliding key 10. Said sliding key 10 is formed with a cam face 22 under the pulley D and with a cam face 23 under the pulley D', said cam face being inclined in opposite directions so that, by sliding said key 10 longitudinally the plunger 21 in one pulley will be forced outwardly, while the plunger in the other pulley will be released and allowed to slide inwardly to release the wedge and clutch.

Near the outer end of key 10 is formed a short double-faced cam 24 adapted to engage with a plunger 25 which operates a wedge 26 in the same manner that plunger 21 operates wedge 18, and expands a clutch ring to lock the shaft C to a stationary yoke 27 in hanger B' and thus stop its motion in either direction.

The pulleys D, D' are formed with perforations 28 through which a screw-driver may be inserted for removing the lock-screw 20 and adjusting the wedge holding screw 19 beneath. The other locking screws shown are operated in a similar manner, as will be readily understood. The driving shaft, with pulleys of varying sizes belted to pulleys D and D', is not shown, as it may be any appropriate driving shaft and of common arrangement. The driving belts may be arranged to drive in reverse directions, if desired, as will be readily understood, and the gear thus converted into a reversing gear.

In operation, the parts being in the position shown in Fig. 1, both pulleys D and D' are free and the shaft C is locked to the yoke 27. If it is desired to lock pulley D to shaft C, and thus drive said shaft through the belt on said pulley, key 10 is forced to the right by means of the lever 13. Cam 24 passes from beneath plunger 25 and releases shaft C from its locked position, while plunger 21, within pulley D and the wedge 18 carried thereby, is forced outwardly between the adjacent edges of the clutch ring 17, expanding said clutch ring against the interior surface of said pulley, thus locking it securely to the clutch ring and, through the clutch ring, to said shaft C, which is thus driven thereby. When it is desired to change the speed of the shaft, key 10 is slid to the left, which first releases the clutch within pulley D, sets the clutch within the yoke 27, stops the shaft, then releases said clutch within yoke 27, sets the clutch within pulley D', locks said pulley to shaft C and drives said shaft through the belt on said pulley, which being of different size will secure the desired change in speed.

While I have shown the clutch as thus adapted for use in change speed mechanism, it will be understood, of course, that the construction of clutch is adapted for use in any connection desired, either singly, or in any arrangement that may be found suitable, as in reversing gear, above mentioned.

Having thus fully described my said invention, what I claim as new and desire to secure by Letters Patent, is:

A friction clutch comprising a shaft formed with a longitudinal groove, a key or bar slidably mounted in said groove and formed with a series of cam faces on one edge, a grooved bushing mounted on said shaft; a ring in said bushing, said ring being connected by pivots with a yoke mounted on a suitable support, a lever connected therewith for operating the same to slide said key back and forth, a series of belt pulleys mounted on said shaft and each formed with a hub formed with a lining and provided with a hub secured to said shaft and formed with expansible portions, a plunger mounted in said hub with one end engaging with a cam face of said key and the other end engaging a wedge, said wedge mounted with its point engaging between the parts of said expansible portion of the hub, all substantially as set forth.

In witness whereof I have hereunto set my hand and seal at Waynesboro, Pennsylvania, this 28th day of September, A. D. nineteen hundred and ten.

AMOS P. STEINER. [L. S.]

Witnesses:
E. R. SPENKLE,
CHAS. B. CLAYTON.